INVENTOR.
Bernard Long
BY
Nobbe & Swope
ATTORNEYS

May 20, 1969  B. LONG  3,445,213
MANUFACTURE OF A CONTINUOUS GLASS SHEET
ON A MOLTEN METAL BATH

Filed May 27, 1965 Sheet 3 of 3

INVENTOR.
Bernard Long
BY
Nobbe & Swope
ATTORNEYS

United States Patent Office 3,445,213
Patented May 20, 1969

3,445,213
MANUFACTURE OF A CONTINUOUS GLASS
SHEET ON A MOLTEN METAL BATH
Bernard Long, Paris, France, assignor to Libbey-Owens-Ford Company, a corporation of Ohio
Filed May 27, 1965, Ser. No. 459,168
Claims priority, application France, June 22, 1964,
979,178
Int. Cl. C03b 29/04, 18/02
U.S. Cl. 65—65                       11 Claims

ABSTRACT OF THE DISCLOSURE

Producing a glass ribbon of reduced thickness by moving a ribbon of glass at elevated temperature over a bath of molten metal and maintaining a layer of liquid on a section of the ribbon to apply pressure on a predetermined length and across the width of the upper surface of the ribbon, so that the glass in the ribbon is caused to flow in the direction of its movement and thereby reduce the thickness of the ribbon.

---

The present invention concerns the manufacture of a continuous glass sheet whose surfaces possess the "fire polish" as well as an excellent planimetry.

At the present time such a continuous sheet is obtained in particular by solidifying on the surface of a melted metal bath a continuous current of liquid glass which spreads on it freely under the action of gravity and surface tension.

The thickness of the continuous sheet obtained under these conditions is about 6 millimeters when the industrial glass used to form the continuous sheet has a surface tension of about 330 c.g.s. units and a density around 2.50.

It should be emphasized that this thickness is practically the thickness of equilibrium which a volume of liquid glass takes under the action of gravity and surface tension when deposited on a horizontal surface which it does not wet.

The thickness of 6 millimeters is suitable for certain applications of sheet glass for example building glazings but in many countries the quantity absorbed by these applications only represents a low percentage of the total quantity consumed, the major part of which has a smaller thickness.

Thus the thickness required for the tempered glazings of automotive vehicles are included between 4 and 5 millimeters. On the other hand to make the "sandwich" glazing of automotive vehicles, one needs sheets whose thickness is about 3 millimeters.

Thus the problem presents itself of producing a continuous glass sheet whose surfaces possess the "fire polish" as well as an excellent planimetry and whose thickness is definitely less than 6 millimeters.

It was hoped to find a satisfactory solution of this problem by thinning by means of drawing, a continuous sheet having consistently a thickness of about 6 millimeters which was obtained by the techniques giving the surfaces planimetry and "fire polish."

Experience has shown that the transformation of a continuous sheet of 6 millimeters into a continuous sheet of lesser thickness by drawing reduces the initial planimetry to an unacceptable degree.

The present invention has for its object a new process, making it possible to obtain a continuous sheet with a thickness included between around 2 and 6 millimeters and whose surfaces have qualities comparable at all points to those possessed by a continuous sheet of 6 millimeter thickness obtained by recent shaping techniques.

The process according to the invention consists essentially in the succession of the following operations:

(1) From the liquid glass, one forms, in a known manner, in a non-oxidizing atmosphere, a continuous sheet which one moves on the surface of a melted metal bath, the thickness of this continuous sheet being at least equal to the thickness of equilibrium which is taken by a volume of liquid glass, spreading freely, in a non-oxidizing atmosphere, under the action of gravity and of surface tension on a horizontal surface which it does not wet.

(2) On a certain length of this continuous sheet and over its whole width which one keeps constant, one maintains a continuous layer of melted metal having a thickness at least equal to the thickness of equilibrium which it takes when it spreads freely under the action of gravity and of surface tension on a horizontal surface of glass which it does not wet, the said melted metal layer exercising without discontinuity on each transverse band element of the continuous sheet a pressure uniformly distributed in such a way that the continuous sheet flows in the direction of its movement and shows at the end of the zone covered by the melted metal, the desired thickness less than 6 mm.

(3) Then one suddenly hardens the thinned sheet in order to conserve its thickness, then one cools it progressively in a known manner while one continues to move it on the surface of the melted metal bath until it can be disengaged from this bath and rest on the carrying rollers of an annealing lehr without the planimetry and the polish of its surfaces having been damaged.

One sees immediately that in the above process, the thinning of the continuous sheet is obtained by preventing its lateral spreading and making it flow longitudinally under the effect of a relatively low pressure acting over a relatively long period of time.

One sees also that the pressure which produces the thinning, being exercised by the melted metal up to the moment of strong hardening, the "fire polish" of the upper surface of the continuous sheet is not damaged.

The initial continuous sheet which is subjected to the thinning process according to the present invention can be produced in different ways, notably by the process described by the applicant in the patent application filed Oct. 23, 1963 under the number P.V. 951,540 and which consists essentially in isolating in an appropriate channel a horizontal current of constant thickness included between 6 and 8 millimeters and formed by taking off the surface currents of a tank furnace at a small distance from the "hot point" and then hardening this current suddenly after having regularized its thickness.

The initial continuous current to which one applies the process of the present invention can also come from the spreading of liquid glass poured on the surface of a melted metal bath and whose thickness has been regularized and then stabilized.

The initial continuous sheet is generally thinned at a temperature included between 900 and 1100° C.

In order to accomplish the thinning, one uses the following device:

One places against each of the edges of the continuous sheet a fixed rectilinear bar not wetted by the glass, for example, of graphite, which makes it possible to move the continuous sheet without appreciable lateral friction while at the same time preventing it from flowing laterally under the pressure of melted metal.

The molten metal layer is maintained laterally by the two bars in question. Longitudinally it is generally not necessary to contain it between two transverse bars since it maintains itself without difficulty in the hollow which results from a certain sinking of the continuous sheet in the melted metal bath and the rising to the surface of the continuous sheet once it has been thinned and hardened.

The melted metal should preferably be such that the thickness of its layer of equilibrium on the glass makes it possible to thin the continuous sheet lower than the lowest thickness used. One then takes the necessary arrangements so that the thickness of the glass actually desired, is obtained at the end of the layer of melted metal which compresses the continuous sheet.

For a given melted metal, the length of this layer is obviously a function of its thickness and of the viscosity of the continuous glass sheet.

In the famework of the above considerations, a number of metals are capable of giving satisfaction particularly tin, silver, gold.

The thickness of equilibrium on glass in a nonoxidizing atmosphere, in the temperature domain of 900–1100° C. has approximately the following values:

| For melted— | Millimeters |
| --- | --- |
| Tin | 4.6 |
| Silver | 5.1 |
| Gold | 4.2 |

The thickness of equilibrium of a continuous glass sheet under the pressure of a layer of 4.6 millimeters of melted tin, of a layer of 5.1 millimeters of melted silver or of a layer of 4.2 millimeters of melted gold are respectively about 2.6; 1.8; and 1.3 millimeters.

Melted tin is particularly interesting since it is currently employed to constitute the bath which supports the continuous glass sheet.

A layer of 4.6 millimeters of melted tin makes it possible to obtain all the thicknesses of the continuous sheet included between the intial thickness (which is, in geneneral, the thickness of equilibrium say around 6 millimeters) and the thickness of 2.6 millimeters mentioned above, it being understood that in order to hold the continuous glass sheet to any one of these thicknesses, it is necessary to harden it suddenly, then to continue its cooling progressively until it can leave the surface of the melted metal bath which supports it without its surfaces being damaged by subsequent contacts.

It should be noted here that one can accelerate the thinning, that is to say reduce the length of the hollow containing the melted metal by having recourse to thicknesses of melted metal greater than the thickness of equilibrium on glass. It suffices then to make between the edges of the continuous sheet and the bars of graphite which enclose it, seams of sufficiently small width so that according to the laws of capillary attraction, the melted metal does not penetrate into them.

The present invention will be better understood by referring to the attached drawing which represents as an example, diagrammatically and non-limiting, the devices for the application of the process of the invention and on which:

Figure 1:
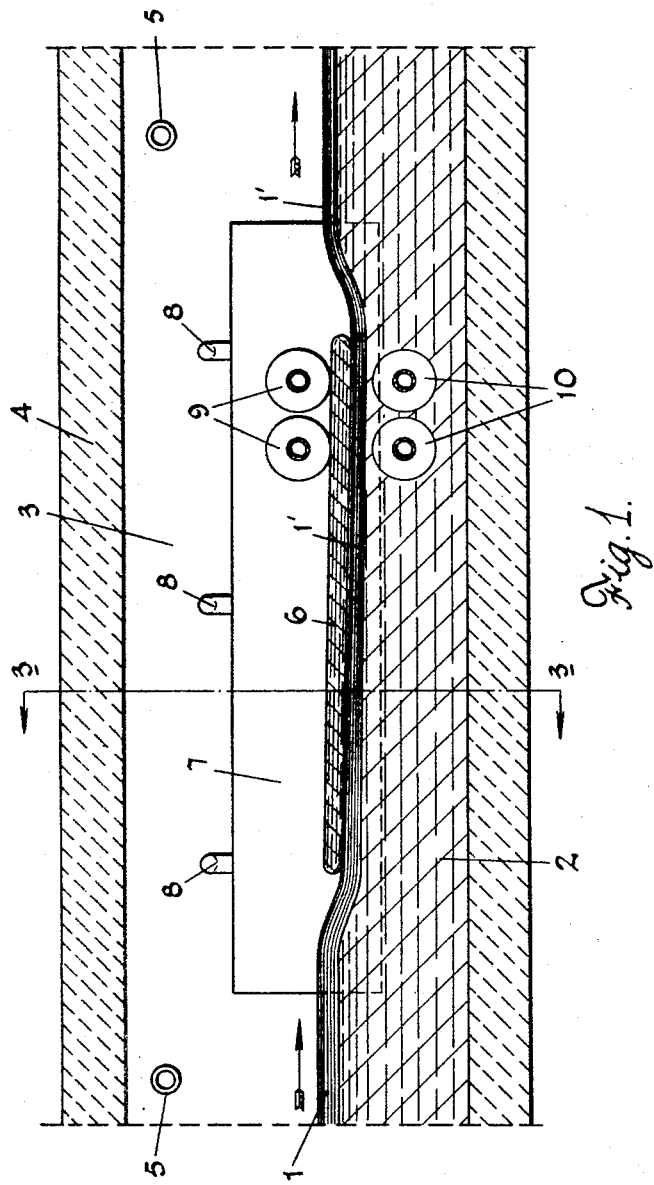
FIG. 1 represents in vertical longitudinal section the thinning of a continuous sheet by the pressure of a layer of melted metal.
Figure 2:
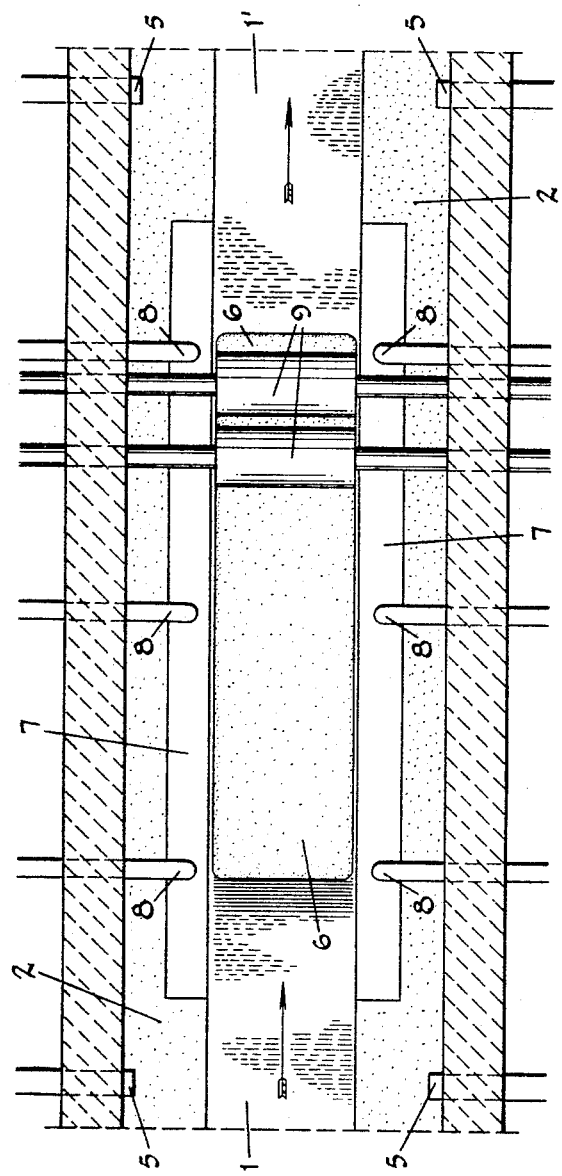
FIG. 2 is a plan view of the device of FIG. 1, assuming the removal of the superstructure which is above the continuous sheet.

In FIGS. 1 and 2, the continuous sheet to be thinned 1, which has a thickness equal to or greater than 6 millimeters, moves in the direction of the arrow from left to right on the surface of the bath of melted tin 2 from the hot end to the cold end of the chamber 3, covered by the crown 4.

The atmosphere of the chamber is maintained non-oxidizing by supplying nitrogen through refractory tubes 5.

The continuous sheet 1 is thinned thanks to the pressure exercised on its upper surface by the layer of melted tin 6.

Figure 3:
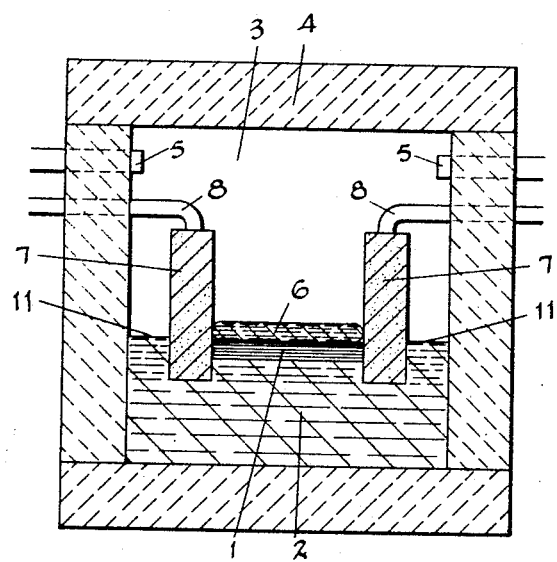
FIG. 3 represents a tranverse vertical section along 3—3 of the thinning device of FIG. 1.

During the thinning, the sidewise spreading of the continuous sheet is prevented by the bars of graphite 7, applied against its edges and which are maintained in a fixed position by means of curved rods 8 (see also FIG. 3).

The layer of melted tin 6 is contained laterally by the bars 7, longitudinally it maintains itself in the hollow which its weight imposes on the continuous sheet.

When the desired thinning is obtained, the thickness of the thinned continuous sheet is stabilized by strongly hardening the glass:

On the one hand by the cooled graphite rollers 9 which are in contact with the layer of tin 6; by adjusting their height one varies the surface of contact and consequently the intensity of cooling.

On the other hand, by the cooled rollers 10, immersed in the tin bath 2 and whose distance from the thinned continuous sheet is adjustable.

In FIG. 3, the surface of the tin bath 2 is designated by 11. One sees clearly that the layer of melted tin 6 has caused a certain sinking of the continuous sheet 1 in the tin bath.

It is well understood that the mode of realization described above has no limiting character and can receive any desirable modifications without thereby departing from the framework of the invention.

I claim:

1. In a method of producing in a non-oxidizing atmosphere a continuous sheet of glass, of a thickness between about 2 and 6 millimeters with fire polished surfaces and excellent planimetry, from a continuous ribbon, of a thickness at least equal to the thickness of equilibrium which a volume of liquid glass takes in spreading freely in a non-oxidizing atmosphere under the action of gravity and of surface tension on a surface which it does not wet, formed in a known manner on the surface of a bath of molten metal from liquid glass; the improvement comprising moving said ribbon in the direction of its length on the surface of said bath; maintaining a layer of molten metal, of a thickness at least equal to the equilibrium thickness it attains in spreading freely under the action of gravity and surface tension on a horizontal glass surface which it does not wet, on a predetermined length and over the entire width of said ribbon, to exert a uniform pressure on a transverse strip of said ribbon and so cause the ribbon to flow in the direction of its movement and reduce the thickness thereof; suddenly cooling the ribbon to preserve said reduced thickness; and then progressively further cooling said ribbon as it moves over said bath of molten metal beyond the predetermined length of said ribbon on which the overlying layer of molten metal is maintained until it can be separated from said bath and supported on rollers without damage to its planimetry or the fire polish of its surfaces.

2. A method as defined in claim 1 in which the width of said ribbon is maintained constant during the reduction of its thickness.

3. A method as defined in claim 1 in which said layer of molten metal is of a thickness greater than said equilibrium thickness.

4. In apparatus for producing a relatively thin continuous sheet of glass from a ribbon of glass formed from liquid glass that has spread freely under the action of gravity and surface tension to its equilibrium thickness on a bath of molten metal and is moving over the bath toward the exit end thereof where it is disengaged from said bath, the improvement comprising a layer of molten metal, and means for locating and retaining the same on a predetermined area of the upper surface of said ribbon preceding and spaced from the point of disengagement of said ribbon from said bath.

5. Apparatus as defined in claim 4 in which there is also provided means for preventing lateral flow of said ribbon of glass while under said molten metal.

6. Apparatus as defined in claim 4 in which means are provided for chilling said ribbon after its thickness has been reduced by pressure exerted thereon by said layer of molten metal.

7. Apparatus as defined in claim 6 in which said chilling means comprise rollers located above and below said ribbon.

8. In a method of reducing the thickness of a ribbon of glass moving over a bath of molten metal to a point where it is disengaged therefrom, the improvement which comprises establishing and maintaining a layer of liquid on a section of the length of the ribbon preceding and spaced from said point of disengagement so as to exert pressure on a predetermined length and across the width of the upper surface of said ribbon, whereby the glass in said ribbon is caused to flow in the direction of its movement and so reduce the ribbon thickness.

9. A method as defined in claim 8 in which lateral flow of the glass in said ribbon is prevented during said pressing.

10. A method as defined in claim 8 in which said ribbon is chilled after said pressing to preserve the reduced thickness, and is then gradually cooled to handling temperature on said molten bath.

11. A method as defined in claim 8 in which said pressure is exerted along a constantly shifting transverse area of said ribbon.

References Cited

UNITED STATES PATENTS

| | | | |
|---|---|---|---|
| 2,754,559 | 7/1956 | Fromson | 65—65 |
| 3,241,939 | 3/1966 | Michalik | 65—65 |
| 3,266,880 | 8/1966 | Pilkington | 65—65 |
| 3,326,651 | 6/1967 | Javaux | 65—65 |

DONALL H. SYLVESTER, *Primary Examiner.*

A. D. KELLOGG, *Assistant Examiner.*

U.S. Cl. X.R.

65—99, 182, 374